UNITED STATES PATENT OFFICE.

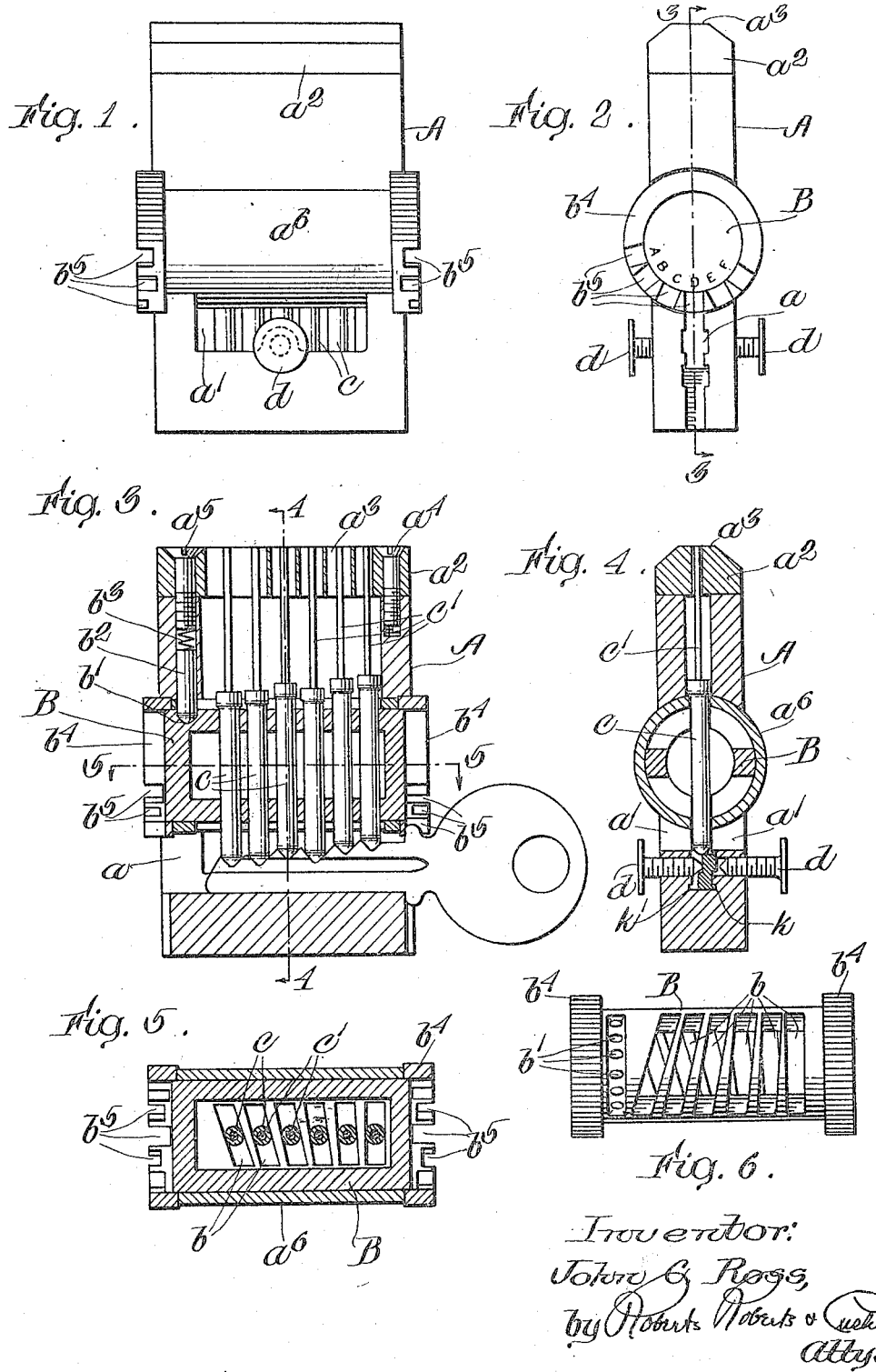

JOHN C. ROSS, OF BOSTON, MASSACHUSETTS.

ADJUSTABLE KEY-GAGE.

1,207,217.  Specification of Letters Patent.  Patented Dec. 5, 1916.

Application filed December 24, 1915. Serial No. 68,524.

*To all whom it may concern:*

Be it known that I, JOHN C. ROSS, a citizen of the United States, and resident of Boston, in the county of Suffolk and State of Massachusetts, have invented new and useful Improvements in Adjustable Key-Gages, of which the following is a specification.

This invention relates to key gages of the type shown in Letters Patent of the United States No. 1,175,819, granted to me March 14, 1916, having a number of extensible and contractible gage members movably mounted in a frame and adapted to make contact with a key in a key-way, to indicate in relation to a gage surface, the contour of the key. In the key gage shown in my said former patent the relative spacing of the gage members one from another is fixed or immovable, and the gage can only be used for keys having their notches or serrations correspondingly spaced.

One of the principal objects of this invention is to provide means for varying the relative spacing of the gage members one from another, so as to make the key gage of more general application to keys having differently spaced serrations.

A further object of the invention is to provide a range of adjustability, and means automatically to determine the position of adjustment, of the gage members appropriate to a number of predetermined spacings or positions corresponding to the spacings of the notches or serrations of a number of standard or selected forms of keys.

These and other features will hereinafter be more fully described and particularly pointed out in the claims.

In the accompanying drawings, which illustrate a preferred embodiment of the invention,—Figure 1 is a side elevation of a key gage containing the invention; Fig. 2 is an end view of said key gage; Fig. 3 is a section on line 3—3 of Fig. 2, showing a key in the key-way; Fig. 4 is a section on line 4—4 of Fig. 3; Fig. 5 is a section on line 5—5 of Fig. 3; and Fig. 6 is a plan view of the rotary slotted grid, which is the preferred means for shifting the gage members.

A represents the frame or housing of the gage having a key-way $a$, which may open through one or both ends of the frame; as herein shown the key-way opens through both ends so that a key may be inserted from either end, thus making it possible to double the number of forms of keys which may be tested, as hereinafter explained. Sight apertures $a'$ are provided in the sides of the frame at the sides of the key-way to expose to view the notched edge of the key and the ends of the key and the ends of the gage pins. A gage plate $a^2$ having a gage surface $a^3$ is secured to the top of the frame by screws $a^4$ and $a^5$.

Above the key-way is a rotary barrel or cylinder B, mounted to turn in a cylindrical casing $a^6$ forming part of the frame or housing. This barrel B is hollow, and is provided with two series of slots $b$ arranged opposite to one another and at progressively varying angles. Said barrel thus constitutes a rotary slotted grid for shifting the gage pins as hereinafter described.

The gage members consist, as herein shown, of a series of extensible and contractile or telescoping pin sections, one section of each gage member being a tubular section $c$, and the other a rod section $c'$. The end of the inner sections $c$ is shaped to conform to the notch of a key, and the end of the outer section projects through the gage surface $a^3$ to indicate in relation thereto the contour of a key in the key-way. The two telescoping sections are adjustable lengthwise of each other and are held in adjusted position by frictional engagement. The construction and operation of said gage pins, and the mode of testing a key in the gage, may be substantially as described in my said former patent. The inner sections $c$ of the gage members extend through the slots $b$ of the barrel B. It will thus be seen that by turning the barrel B the gage pins will be shifted bodily lengthwise of the key-way varying distances depending on the pitch or angle of the slots $b$. The angle or inclination of the successive slots $b$ is varied uniformly and progressively so as to maintain substantially equal spaces between the several gage members in all positions thereof as they are shifted lengthwise of the key-way. In the form shown in the drawings the slot $b$ nearest the right hand end as viewed in Figs. 5 and 6, is perpendicular to the axis of the barrel while the other slots are inclined at progressively varying angles. Thus, the gage pin in said end slot will not be shifted lengthwise of the key-way at all, while the other pins will be moved toward or away from the end pin. But the principle of the invention comprehends the varying of the relative spacing of the gage members, and the relative shifting of the gage members lengthwise of the key-way, whether this is accomplished by shifting all or only some of the gage members.

The barrel or cylinder B is provided near one end with a series of notches $b'$ which are engaged by a yielding latch pin $b^2$ mounted to slide in a bore in the frame A, which bore is a continuation of the screw hole receiving screw $a^5$. A coil spring $b^3$ between screw $a^5$ and latch pin $b^2$ urges the latter against the barrel and into notches $b'$. The notches $b'$ are so spaced as to arrest and yieldingly hold the barrel B in predetermined positions corresponding to the desired spacings of the gage pins.

One or both ends of the barrel B are provided with a head $b^4$ in the form of a rim made with a series of slots or notches $b^5$ of varying depths. The several notches $b^5$ are arranged to register with the opening of the key-way when the barrel B is turned to its several predetermined positions at which it is stopped by latch pin $b^3$, and at which the gage pins will stand in the desired spaced relations. Said notches $b^5$ engage the usual shoulder of a key and determine the penetration of the key into the key-way. The several notches are of various depths so that each will arrest the key at the position appropriate to the corresponding spacing of the gage pins; and they may be marked by characters, as shown in Fig. 2, or with the names or initials of standard make keys to indicate at what notch the barrel should be set or adjusted to bring the key stop and the gage pins into correct position for that particular make of key.

Keys for pin tumbler locks usually have a rib $k$ (Fig. 4) along one edge opposite the teeth or serrations. Sometimes said ribs are on the right side and sometimes on the left side. I therefore provide a groove $k'$ at each side of the key-way to receive the rib $k$; and also a pair of adjustable guide screws $d$—$d$, one on each side of the frame A, to bear against the side of the key opposite the rib $k$ and hold the rib in the groove. This insures the correct positioning of the key in the key-way, and prevents the lower edge of the key from tilting off from the bottom of the key-way.

The gage may be adjusted to test as many different varieties of keys as there are notches in the head or key stop $b^4$; and by having an adjustable key stop at both ends of the rotary grid the capacity of the gage for adjustment to numerous styles of keys may be double what it would be if the keys were inserted at one end only of the key-way.

I claim:

1. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and means to vary the relative spacing of said gage members one from another.

2. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and means to shift some at least of said gage members in a direction lengthwise of the key-way to vary the relative spacing of said gage members one from another.

3. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and means to shift some at least of said gage members in a direction lengthwise of said key-way progressively varying distances, to vary the relative spacing of said gage members one from another, said means being adapted to maintain substantially equal spaces between the several gage members in all positions thereof.

4. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and a movable slotted grid adapted to vary the relative spacing of said gage members one from another.

5. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and a movable slotted grid adapted to shift some at least of said gage members in a direction lengthwise of the key-way to vary the relative spacing of said gage members one from another.

6. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, a movable grid having slots arranged at progressively varying angles to one another to shift some at least of said gage members in a direction lengthwise of said key-way progressively varying distances to vary the relative spacing of said gage members one from another and to maintain substantially equal spaces between the several gage members in all positions thereof.

7. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and a rotary slotted grid adapted to vary the relative spacing of said gage members one from another.

8. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, and a rotary slotted grid adapted to shift some at least of said gage members in a direction lengthwise of the key-way to vary the relative spacing of said gage members one from another.

9. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, a rotary grid having slots arranged at progressively varying angles to one another to shift some at least of said gage members in a direction lengthwise of said key-way progressively varying distances to vary the relative spacing of said gage members one from another and to maintain substantially equal spaces between the several gage members in all positions thereof.

10. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, an adjustable key stop to determine the penetration of the key into the key-way, and means to vary the relative spacing of said gage members and simultaneously to adjust the key stop to predetermined positions severally appropriate to the various positions of the gage members.

11. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, an adjustable key stop to determine the penetration of a key into the key-way, and a movable grid the operation of which both shifts the gage members to vary their relative spacing one from another and also adjusts the key stop to predetermined positions severally appropriate to the various positions of the gage members.

12. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, a rotary slotted grid adapted to vary the relative spacing of said gage members one from another, and an adjustable key stop moving with said rotary grid provided with a series of stop surfaces adapted severally to determine the penetration of a key into the key-way distances appropriate to the several corresponding positions of the gage members.

13. A key gage comprising a frame having a key-way and a gage surface, a number of extensible and contractile gage members movably mounted in said frame adapted to make contact with a key in the key-way and coöperating with the gage surface to indicate in relation to the gage surface the contour of a key in the key-way, a rotary slotted grid adapted to vary the relative spacing of said gage members one from another, and an adjustable key stop on the end of the rotary grid and turning therewith provided with a series of notches adapted severally to determine the penetration of a key into the key-way distances appropriate to the several corresponding positions of the gage members.

Signed by me at Boston, Massachusetts, this 18th day of December 1915.

JOHN C. ROSS.

Copies of this patent may be obtained for five cents each, by addressing the "Commissioner of Patents, Washington, D. C."